(12) United States Patent
Zhao et al.

(10) Patent No.: US 10,557,526 B2
(45) Date of Patent: Feb. 11, 2020

(54) MECHANICAL TRANSMISSION AND METHOD FOR CONTROLLING THE MECHANICAL TRANSMISSION

(71) Applicants: Kegang Zhao, Guangzhou (CN);
Xiangdong Huang, Guangzhou (CN);
Yong Yang, Guangzhou (CN)

(72) Inventors: Kegang Zhao, Guangzhou (CN);
Xiangdong Huang, Guangzhou (CN);
Yong Yang, Guangzhou (CN)

( * ) Notice: Subject to any disclaimer, the term of this patent is extended or adjusted under 35 U.S.C. 154(b) by 829 days.

(21) Appl. No.: 15/107,341

(22) PCT Filed: Jan. 5, 2015

(86) PCT No.: PCT/CN2015/070115
§ 371 (c)(1),
(2) Date: Jun. 22, 2016

(87) PCT Pub. No.: WO2016/109922
PCT Pub. Date: Jul. 14, 2016

(65) Prior Publication Data
US 2016/0348761 A1    Dec. 1, 2016

(51) Int. Cl.
*F16H 3/093*  (2006.01)
*F16H 3/00*  (2006.01)
*F16H 61/04*  (2006.01)
*F16H 37/02*  (2006.01)

(52) U.S. Cl.
CPC ............. *F16H 3/093* (2013.01); *F16H 3/006* (2013.01); *F16H 37/02* (2013.01); *F16H 61/0403* (2013.01); *F16H 2003/0933* (2013.01); *F16H 2061/0407* (2013.01); *F16H 2200/0034* (2013.01)

(58) Field of Classification Search
CPC ...... F16H 3/093; F16H 3/006; F16H 61/0403; F16H 2003/0933; F16H 2061/0407
USPC .......................................................... 74/325
See application file for complete search history.

(56) References Cited

U.S. PATENT DOCUMENTS

| | | | | |
|---|---|---|---|---|
| 8,696,505 B2 * | 4/2014 | Lee | ........................ | B60K 6/40 475/5 |
| 8,887,589 B2 * | 11/2014 | Ibamoto | .................. | F16H 3/08 74/330 |
| 9,227,623 B2 * | 1/2016 | Kaltenbach | ............. | B60K 6/48 |

* cited by examiner

*Primary Examiner* — William C Joyce (57) ABSTRACT

A mechanical transmission and a method for controlling the mechanical transmission. The mechanical transmission includes an input shaft, a first engagement sleeve, a second engagement sleeve, a clutch, an odd gear output shaft and an even gear output shaft. A power transmission route is formed, then by sequentially controlling the coupling and disengaging of the clutch, and the combining and quitting of the first engagement sleeve and the second engagement sleeve, the power of the input shaft is alternatively conveyed to the odd gear output shaft or the even gear output shaft, thus up-shift and down-shift operations are completed. In this way, the number of the clutch is reduced, which decreasing the volume of the transmission accordingly, and meanwhile reducing the dragging resistance produced by the clutches and the cost of the transmission, also improving the transmission efficiency.

14 Claims, 8 Drawing Sheets

MECHANICAL TRANSMISSION AND METHOD FOR CONTROLLING THE MECHANICAL TRANSMISSION

TECHNICAL FIELD

The present invention relates to a mechanical transmission and a method for controlling the mechanical transmission.

BACKGROUND

To implement two-step velocity ratio power shift, a stepped automatic transmission generally employs two or more than two friction elements (clutch or brake), which are installed in a transmission in parallel, and controls the working states of the two or more than two friction elements (clutch or brake), thus a gear change without driving force interrupt can be achieved.

For the comparatively large volume of the friction element (clutch or brake), two or more than two friction elements (clutch or brake) will occupy a considerable space in the transmission, which is not beneficial for adding the gears by increasing the quantity of wheel gears; moreover, the friction element (clutch or brake) will produce a dragging resistance during idling, and the more the friction elements (clutch or brake) in the transmission are, the larger the dragging resistance produced is, that makes the gear efficiency of the transmission lower. Therefore, it is a development trend for the transmission to reduce the quantity of the friction elements (clutch or brake).

SUMMARY

The object of the present invention is to provide a mechanical transmission and a method for controlling the mechanical transmission.

According to one aspect of the present invention, a mechanical transmission is provided, including an input shaft, a first engagement sleeve, a second engagement sleeve, a clutch, an odd gear output shaft and an even gear output shaft, wherein the driving parts of the first engagement sleeve and the second engagement sleeve are connected with the input shaft, the driven part of the first engagement sleeve is connected with the odd gear output shaft on one hand, and is connected with the even gear output shaft through the clutch on the other hand, and the driven part of the second engagement sleeve is connected with the even gear output shaft on one hand, and is connected with the odd gear output shaft through the clutch on the other hand.

According to the invention, one clutch, a first engagement sleeve, a second engagement sleeve, an odd gear output shaft and an even gear output shaft form a power transmission route: for up-shift and down-shift operations. By controlling the coupling and disengaging of the clutch, the combining and quitting of the first engagement sleeve and the second engagement sleeve sequentially, the power of the input shaft is alternatively conveyed to the odd gear output shaft or the even gear output shaft, and ultimately, outputted to a subsequent output shaft continuously, thus the up-shift and down-shift operations of the mechanical transmission can be finished capably. As gear shifting of the mechanical transmission is completed through one clutch matching with the first engagement sleeve and the second engagement sleeve only, the number of the clutch in the prior art is reduced, thus decreasing the volume of the transmission, and reducing the dragging resistance produced by the clutches in the present transmission, improving the transmission efficiency, and also cutting the production cost of the entire mechanical transmission down at the same time.

In some embodiments, a transmission mechanism I, a transmission mechanism II, a transmission mechanism III and a transmission mechanism IV may also be included; the first engagement sleeve is connected with the odd gear output shaft through the transmission mechanism I on one hand, and is connected with the even gear output shaft through the transmission mechanism II, the clutch, the transmission mechanism III and the transmission mechanism IV in sequence on the other hand; the second engagement sleeve is connected with the even gear output shaft through the transmission mechanism IV on one hand, and is connected with the odd gear output shaft through the transmission mechanism III, the clutch, the transmission mechanism II and the transmission mechanism I in sequence on the other hand. In this way, the first engagement sleeve transmits power to the odd gear output shaft through the transmission mechanism I on one hand, and on the other hand, the first engagement sleeve transmits power to the even gear output shaft through the transmission mechanism II, the clutch, the transmission mechanism III and the transmission mechanism IV in sequence; the second engagement sleeve transmits power to the even gear output shaft through the transmission mechanism IV on one hand, and on the other hand, the second engagement sleeve transmits power to the odd gear output shaft through the transmission mechanism III, the clutch, the transmission mechanism II and the transmission mechanism I in sequence.

In some embodiments, an I gear transmission pair, an II gear transmission pair and an output shaft may also be included, wherein the odd gear output shaft is connected with the output shaft through the I gear transmission pair, and the even gear output shaft is connected with the output shaft through the II gear transmission pair. In this way, the odd gear output shaft can output the power of the input shaft to the output iii shaft through the I gear transmission pair, and the even gear output shaft can output the power of the input shaft to the output shaft through the II gear transmission pair.

In some embodiments, the I gear transmission pair is configured with an I gear synchronizer, and the II gear transmission pair is configured with an II gear synchronizer. With the I gear synchronizer, it can make sure that the rotating speed of the odd gear output shaft is consistent with that of the output shaft, and with the II gear synchronizer, it can make sure that the rotating speed of the even gear output shaft is consistent with that of the output shaft.

In some embodiments, the transmission mechanism I, the transmission mechanism II, the transmission mechanism III and the transmission mechanism IV may be transmission mechanisms that partially or entirely adopt gear transmission, or transmission mechanisms that partially or entirely adopt chain transmission, or transmission mechanisms that partially or entirely adopt belt transmission. In this way, the transmission mechanism I, the transmission mechanism II, the transmission mechanism III and the transmission mechanism IV may be suitable for different arrangement requirements by adopting gear transmission, chain transmission or belt transmission.

In some embodiments, the clutch may be a dry clutch, a wet clutch, a magnetic clutch, a hydraulic coupler, a hydraulic torque converter, an electric-drive clutch, or a hydraulic-drive clutch. In this way, the maximum transfer moments of various clutches are different, the vibration damping abilities during the moment of gear shifting are different, and the transmission efficiencies are also different, so that it can satisfy the demands of vehicles in different types.

According to an aspect of the present invention, there is also provided a method for controlling up-shift of the mechanical transmission, including the following steps of:

S101: engaging a first gear, and combining a second engagement sleeve;

S102: gradually coupling a clutch to output the power of an input shaft to the first gear;

S103: combining a first engagement sleeve;

S104: gradually disengaging the clutch; and

S105: quitting the second engagement sleeve to complete first gear startup.

The power of the input shaft can be continuously outputted to an odd gear output shaft by sequentially controlling the coupling and disengaging of the clutch, and the combining and quitting of the first engagement sleeve and the second engagement sleeve, thus the up-shift and down-shift operations of the mechanical transmission can be achieved.

In some embodiments, the method may also include the steps of:

S106: engaging a second gear;

S107: gradually coupling the clutch, wherein the power of the first gear decreases while the power of the second gear increases at the same time;

S108: when the power of the first gear decreases close to 0, quitting an I gear synchronizer, so that the power of the first gear decreases to 0.

S109: when the clutch is completely coupled, combining the second engagement sleeve;

S110: disengaging the clutch, and quitting the first engagement sleeve; and

S111: outputting the power of the input shaft to the second gear to complete the up-shift of the second gear. In this way, up-shift of a power gear can be implemented through the matching operation among one clutch, the first engagement sleeve and the second engagement sleeve, so that the transmission efficiency is increased.

According to an aspect of the present invention, there is also provided a method for controlling the mechanical transmission to decrease from a second gear to a first gear, including the following steps of:

S201: combining a first engagement sleeve when the first gear is not engaged;

S202: coupling a clutch;

S203: quitting a second engagement sleeve;

S204: after the clutch is gradually disengaged to a slipping state, increasing the rotating speed of an input shaft;

S205: when the rotating speeds at the two ends of an I gear synchronizer are the same, engaging the first gear, i.e., engaging the I gear synchronizer; and S206: disengaging the clutch to decrease from the second gear to the first gear.

The power of the input shaft can be continuously outputted to an odd gear output shaft by sequentially controlling the coupling and disengaging of the clutch, and the combining and quitting of the first engagement sleeve and the second engagement sleeve, so as to complete the operation of decreasing from the second gear to the first gear of the mechanical transmission.

According to an aspect of the present invention, there is also provided a method for controlling the mechanical transmission to decrease from a first gear to a neutral gear, including the following steps of:

S301: combining a second engagement sleeve;

S302: coupling a clutch;

S303: quitting a first engagement sleeve; and

S304: disengaging the clutch to decrease from the first gear to the neutral gear.

By sequentially controlling the coupling and disengaging of the clutch, and the combining and quitting of the first engagement sleeve and the second engagement sleeve, the operation of decreasing from the first gear to the neutral gear of the mechanical transmission can be completed.

DETAILED DESCRIPTION

The present invention will be described in details with reference to the drawings hereinafter.

Figure 1:
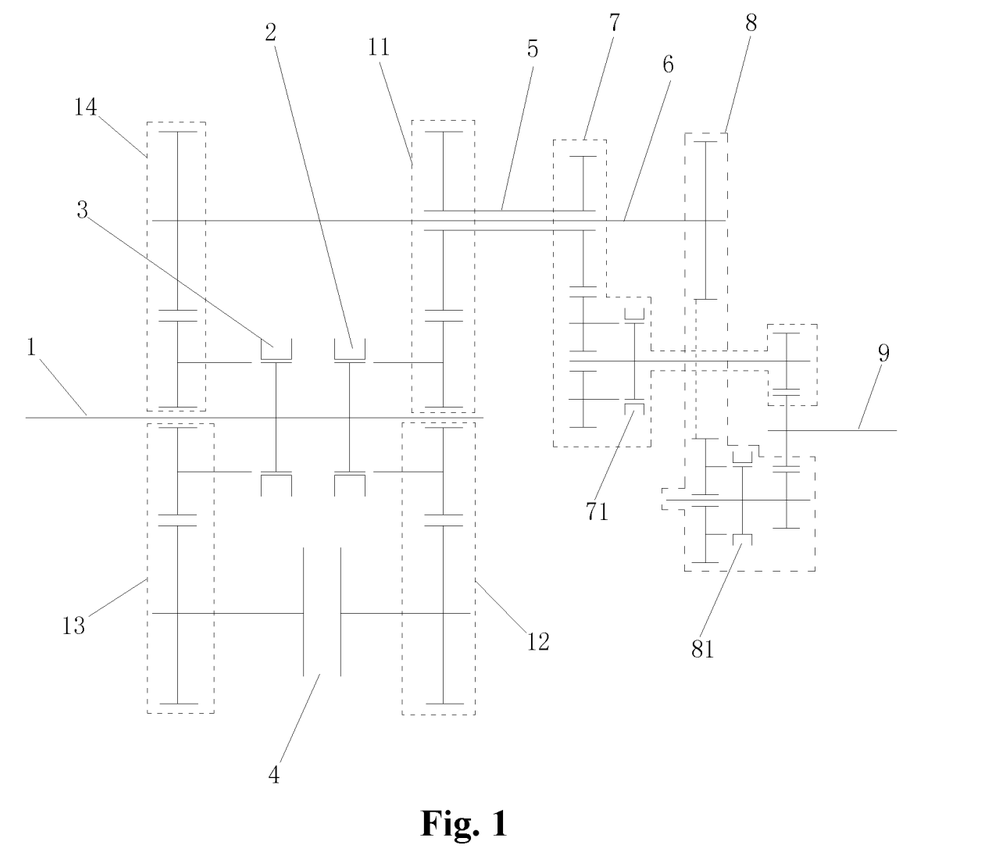
FIG. 1 is a structure diagram of a mechanical transmission, according to one embodiment of the invention.

FIG. 1 schematically displays a structure of a mechanical transmission, according to one embodiment of the present invention.

As shown in FIG. 1, the mechanical transmission includes an input shaft 1, a first engagement sleeve 2, a second engagement sleeve 3, a clutch 4, an odd gear output shaft 5 and an even gear output shaft 6. Furthermore, the mechanical transmission may also include a transmission mechanism I 11, a transmission mechanism II 12, a transmission mechanism III 13, a transmission mechanism IV 14, an I gear transmission pair 7, a II gear transmission pair 8 and an output shaft 9.

As shown in FIG. 1, the left end of the clutch 4 is connected with the even gear output shaft 6 through the transmission mechanism III 13 and the transmission mechanism IV 14 in sequence, and the right end of the clutch 4 is connected with the odd gear output shaft 5 through the transmission mechanism II 12 and the transmission mechanism I 11 in sequence. In the embodiment, the left end of the clutch 4 is a driving end, while the right end is a driven end. In other embodiments, the left end of the clutch 4 can also become a driven end, and the right end becomes the driving end instead.

As shown in FIG. 1, the driving parts of the first engagement sleeve 2 and the second engagement sleeve 3 are connected with the input shaft 1.

In the embodiment, the driven part of the first engagement sleeve 2 is connected with the odd gear output shaft 5 through the transmission mechanism I 11 on one hand, and is connected with the even gear output shaft 6 through the transmission mechanism II 12, the clutch 4, the transmission mechanism III 13 and the transmission mechanism IV 14 in sequence on the other hand; the driven part of the second engagement sleeve 3 is connected with the even gear output shaft 6 through the transmission mechanism IV 14 on one hand, and is connected with the odd gear output shaft 5 through the transmission mechanism III 13, the clutch 4, the transmission mechanism II 12 and the transmission mechanism I 11 in sequence on the other hand. In other embodiments, the driven part of the first engagement sleeve 2 may also be directly connected with the odd gear output shaft 5 on one hand, and may also be directly connected with the even gear output shaft 6 through the clutch 4 on the other hand; the driven part of the second engagement sleeve 3 may also be directly connected with the even gear output shaft 6 on one hand, and may also be directly connected with the odd gear output shaft 5 through the clutch 4 on the other hand.

In the embodiment, the transmission mechanism I 11, the transmission mechanism II 12, the transmission mechanism III 13 and the transmission mechanism IV 14 are transmission mechanisms that entirely adopt gear transmission. In other embodiments, the transmission mechanism I 11, the transmission mechanism II 12, the transmission mechanism III 13 and the transmission mechanism IV 14 may also be transmission mechanisms that partially adopt gear transmission, or transmission mechanisms that partially or entirely adopt chain transmission, or transmission mechanisms that partially or entirely adopt belt transmission.

In the embodiment, the clutch 4 is a dry clutch. In other embodiments, the clutch 4 may also be a dry clutch, a wet clutch, a magnetic clutch, a hydraulic coupler, a hydraulic torque converter, an electric-drive clutch, or a hydraulic-drive clutch.

As shown in FIG. 1, the odd gear output shaft 5 is connected with the output shaft 9 through the I gear transmission pair 7, on which an I gear synchronizer 71 is configured. Thus the odd gear output shaft 5 can output the power of the input shaft 1 to the output shaft 9 through the I gear transmission pair 7, and the I gear synchronizer 71 may ensure that the rotating speed of the odd gear output shaft 5 is consistent with the rotating speed of the output shaft 1.

As shown in FIG. 1, the even gear output shaft 6 is connected with the output shaft 9 through the II gear transmission pair 8, on which an II gear synchronizer 81 is configured. Thus, the even gear output shaft 6 can output the power of the input shaft 1 to the output shaft 9 through the II gear transmission pair 8, and the II gear synchronizer 81 may ensure that the rotating speed of the odd gear output shaft 6 is consistent with the rotating speed of the output shaft 1.

In the embodiment, the odd gear output shaft 5 is connected with the output shaft 9 through the I gear transmission pair 7, and the even gear output shaft 6 is connected with the output shaft 9 through the II gear transmission pair 8. In other embodiments, the I gear transmission pair 7 may also be extended to be an III gear transmission pair, a V gear transmission pair, a VII gear transmission pair and a higher odd gear transmission pair, and the II gear transmission pair 8 may also be extended to be an IV gear transmission pair, a VI gear transmission pair, a VIII gear transmission pair and a higher even gear transmission pair.

The first gear is engaged when startup, and the second engagement sleeve 3 is combined firstly, then the clutch 4 is gradually and entirely combined, so that the power of the input shaft 1 is outputted to the odd gear output shaft 5 through the second engagement sleeve 3, the transmission mechanism III 13, the clutch 4, the transmission mechanism II 12 and the transmission mechanism I 11 in sequence; the odd gear output shaft 5 outputs the power of the input shaft 1 to the output shaft 9 through the I gear transmission pair 7, and then the first engagement sleeve 2 is combined so that the power of the input shaft 1 is outputted to the odd gear output shaft 5 through the second engagement sleeve 3, the transmission mechanism III 13, the clutch 4, the transmission mechanism II 12 and the transmission mechanism I 11 in sequence on one hand, and the power of the input shaft 1 is outputted to the odd gear output shaft 5 through the first engagement sleeve 2 and the transmission mechanism I 11 in sequence on the other hand; then the clutch 4 is gradually disengaged, and the second engagement sleeve 3 is quitted, so that the power of the input shaft 1 is continuously outputted to the odd gear output shaft 5 through the first engagement sleeve 2 and the transmission mechanism I 11 in sequence, and the odd gear output shaft 5 totally outputs the power of the input shaft 1 to the output shaft 9 through the I gear transmission pair 7. Until now, the first gear startup is completed.

After the second gear is engaged, the clutch 4 is gradually coupled, during which period the power of the input shaft 1 is outputted to the even gear output shaft 6 through the first engagement sleeve 2, the transmission mechanism II 12, the clutch 4, the transmission mechanism III 13 and the transmission mechanism IV 14 in sequence, thus the power on the odd gear output shaft 5 decreases while the power on the even gear output shaft 6 increases, and the even gear output shaft 6 outputs the power of the input shaft 1 to the output shaft 9 through the II gear transmission pair 8; then the clutch 4 is completely coupled, and the second engagement sleeve 3 is combined, so the power of the input shaft 1 is outputted to the even gear output shaft 6 through the second engagement sleeve 3 and the transmission mechanism IV 14 in sequence on one hand, and on the other hand, the power of the input shaft 1 is outputted to the even gear output shaft 6 through the first engagement sleeve 2, the transmission mechanism II 12, the clutch 4, the transmission mechanism III 13 and the transmission mechanism IV 14 in sequence; hereafter the clutch 4 is disengaged, and the first engagement sleeve 2 is quitted, thus the power of the input shaft 1 is continuously outputted to the even gear output shaft 6 through the second engagement sleeve 3 and the transmission mechanism IV 14 in sequence, and the even gear output shaft 6 totally outputs the power of the input shaft 1 to the output shaft 9 through the II gear transmission pair 8. Until now, increasing from the first gear to the second gear is completed.

In other embodiments, after the third gear is engaged, the clutch 4 is gradually coupled at first, so that the power of the input shaft 1 is outputted to the odd gear output shaft 5 through the second engagement sleeve 3, the transmission mechanism III 13, the clutch 4, the transmission mechanism II 12 and the transmission mechanism I 11 in sequence, thus the power on the even gear output shaft 6 decreases while the power on the odd gear output shaft 5 increases, and the odd gear output shaft 5 outputs the power of the input shaft 1 to the output shaft 9 through an III gear transmission pair; hereafter the clutch 4 is completely coupled, and the first engagement sleeve 2 is combined, so that the power of the input shaft 1 is outputted to the odd gear output shaft 5 through the second engagement sleeve 3, the transmission mechanism III 13, the clutch 4, the transmission mechanism II 12 and the transmission mechanism I 11 in sequence on one hand; and the power of the input shaft 1 is outputted to the odd gear output shaft 5 through the first engagement sleeve 2 and the transmission mechanism I 11 in sequence on the other hand. Hereafter the clutch 4 is gradually disengaged, and the second engagement sleeve 3 is quitted, so that the power of the input shaft 1 is continuously outputted to the odd gear output shaft 5 through the first engagement sleeve 2 and the transmission mechanism I 11 in sequence, and the odd gear output shaft 5 totally outputs the power of the input shaft 1 to the output shaft 9 through the III gear transmission pair 7. Thus increasing from the second gear to the third gear is completed.

The up-shift operation of the mechanical transmission is completed through the matching operation among one clutch 4, the first engagement sleeve 2 and the second engagement sleeve 3, so that the number of the clutch 4 in the prior art is reduced, thus decreasing the volume of the transmission, and reducing the dragging resistance produced by the clutches 4 in the present transmission, improving the transmission efficiency, and also reducing the production cost of the entire mechanical transmission at the same time.

The principle for increasing from the third gear to a fourth gear is the same as the principle for increasing from the first gear to the second gear, while the principle for increasing from the fourth gear to a fifth gear is the same as the principle for increasing from the second gear to the third gear.

In other embodiments, when decreasing from the third gear to the second gear: the second engagement sleeve 3 is combined, then the clutch 4 is coupled, and the first engagement sleeve 2 is quitted, and when the clutch 4 is gradually disengaged to a slipping state, the power of the input shaft 1 is outputted to the odd gear output shaft 5 through the second engagement sleeve 3, the transmission mechanism III 13, the clutch 4, the transmission mechanism II 12 and the transmission mechanism I 11 in sequence. And at this moment, the rotating speed of the input shaft 1 is improved, and till the rotating speeds (the rotating speed of the odd gear output shaft 5 and the rotating speed of the output shaft 9) at the two ends of the II gear synchronizer 81 are the same, then the second gear is engaged, i.e., the II gear synchronizer 81 is engaged, and the clutch 4 is disengaged, so that the power of the input shaft 1 is continuously outputted to the even gear output shaft 6 through the second engagement sleeve 3 and the transmission mechanism IV 14 in sequence, and the even gear output shaft 6 completely outputs the power of the input shaft 1 to the output shaft 9 through the II gear transmission pair 8. Thus decreasing from the third gear to the second gear is completed.

Decreasing from the second gear to the first gear: the first engagement sleeve 2 is combined, then the clutch 4 is coupled, and the second engagement sleeve 3 is quitted, and when the clutch 4 is gradually disengaged to a slipping state, the power of the input shaft 1 is outputted to the even gear output shaft 6 through the first engagement sleeve 2, the transmission mechanism II 12, the clutch 4, the transmission mechanism III 13 and the transmission mechanism IV 14 in sequence. And at this moment, the rotating speed of the input shaft 1 is improved, and till the rotating speeds (the rotating speed of the even gear output shaft 6 and the rotating speed of the output shaft 9) at the two ends of the I gear synchronizer 71 are the same, the first gear is iii engaged, i.e., the I gear synchronizer 71 is engaged, and the clutch 4 is disengaged, so that the power of the input shaft 1 is continuously outputted to the odd gear output shaft 5 through the first engagement sleeve 2 and the transmission mechanism I 11 in sequence, and the odd gear output shaft 5 completely outputs the power of the input shaft 1 to the output shaft 9 through the through the I gear transmission pair 7. Thus decreasing from the second gear to the first gear is completed.

Decreasing from the first gear to the neutral gear: the second engagement sleeve 3 is combined firstly, then the clutch 4 is also combined, so that the power of the input shaft 1 is outputted to the odd gear output shaft 5 through the first engagement sleeve 2 and the transmission mechanism I 11 in sequence on one hand, and on the other hand, the power of the input shaft 1 is outputted to the odd gear output shaft 5 through the second engagement sleeve 3, the transmission mechanism III 13, the clutch 4, the transmission mechanism II 12 and the transmission mechanism I 11 in sequence. And at this moment, the first engagement sleeve 2 is quitted, and the clutch 4 is disengaged, so that the power of the input shaft 1 cannot be outputted to the odd gear output shaft 5, i.e., the power of the input shaft 1 cannot be outputted to the output shaft 9, so that the first gear is decreased to the neutral gear.

Decreasing from the second gear to the neutral gear: the first engagement sleeve 2 is combined firstly, then the clutch 4 is combined, so that the power of the input shaft 1 is outputted to the even gear output shaft 6 through the second engagement sleeve 3 and the transmission mechanism IV 14 in sequence on one hand, and on the other hand, the power of the input shaft 1 is outputted to the even gear output shaft 6 through the first engagement sleeve 2, the transmission mechanism II 12, the clutch 4, the transmission mechanism III 13 and the transmission mechanism IV 14 in sequence. And at this moment, the second engagement sleeve 3 is quitted, and the clutch 4 is disengaged, so that the power of the input shaft 1 cannot be outputted to the even gear output shaft 6, i.e., the power of the input shaft 1 cannot be outputted to the output shaft 9, so that the second gear is decreased to the neutral gear.

The down-shift operation of the mechanical transmission is completed through the matching operation among one clutch 4, the first engagement sleeve 2 and the second engagement sleeve 3, so that the number of the clutch 4 in the prior art is reduced, thus decreasing the volume of the transmission, and reducing the dragging resistance produced by the clutches 4 in the present transmission, improving the transmission efficiency, and also reducing the production cost of the entire mechanical transmission at the same time.

The principle for decreasing from a fourth gear to a third gear is the same as the principle for decreasing from the second gear to the first gear, while the principle for decreasing from a fifth gear to the fourth gear is the same as the principle for decreasing from the third gear to the second gear.

Figure 2:
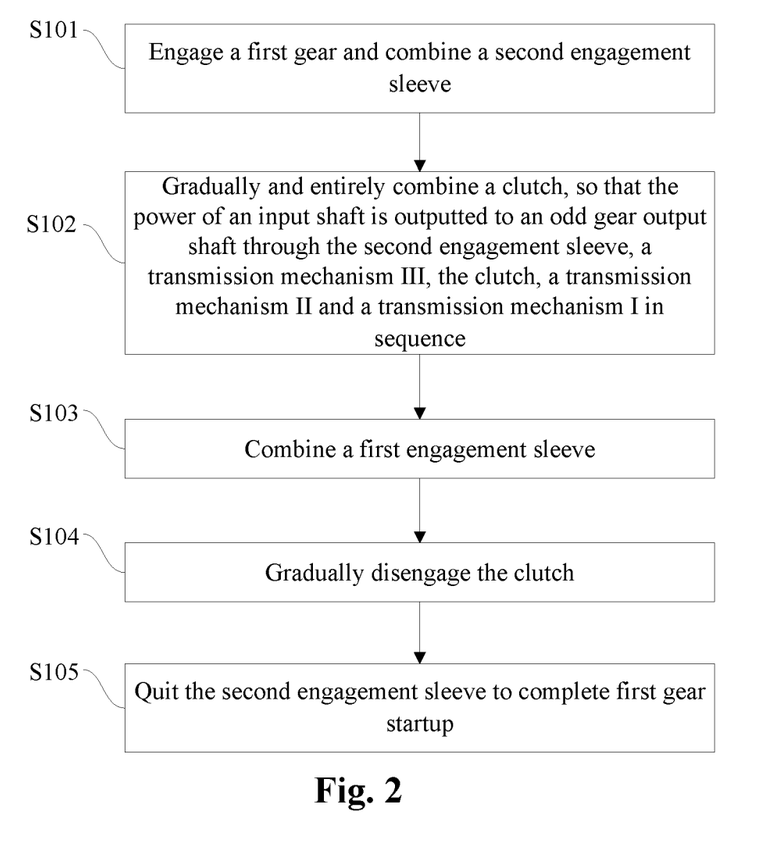
FIG. 2 is a control flow of increasing from a neutral gear to a first gear of the mechanical transmission as shown in FIG. 1.

FIG. 2 schematically displays a control flow of increasing from a neutral gear to a first gear of the mechanical transmission as shown in FIG. 1.

As shown in FIG. 2, the control flow of increasing from the neutral gear to the first gear of the mechanical transmission is as follows:

at S101, a first gear is engaged, and a second engagement sleeve 3 is combined;

at S102, a clutch 4 is gradually and entirely combined, so that the power of an input shaft 1 is outputted to an odd gear output shaft 5 through a second engagement sleeve 3, a transmission mechanism III 13, the clutch 4, a transmission mechanism II 12 and a transmission mechanism I 11 in sequence; and the power of the input shaft 1 is outputted to an output shaft 9 through an I gear transmission pair 7;

at S103, the first engagement sleeve 2 is combined, so that the power of the input shaft 1 is outputted to the odd gear output shaft 5 through the second engagement sleeve 3, the transmission mechanism III 13, the clutch 4, the transmission mechanism II 12 and the transmission mechanism I 11 in sequence on one hand, and on the other hand, the power of the input shaft 1 is outputted to the odd gear output shaft 5 through the first engagement sleeve 2 and the transmission mechanism I 11 in sequence; the odd gear output shaft 5 outputs the power of the input shaft 1 to the output shaft 9 through the I gear transmission pair 7;

at S104, the clutch is gradually disengaged; and at S105, the second engagement sleeve 3 is quitted, so that the power of the input shaft 1 is continuously outputted to the odd gear output shaft 5 through the first engagement sleeve 2 and the transmission mechanism I 11 in sequence, and the odd gear output shaft 5 outputs the power of the input shaft 1 completely to the output shaft 9 through the I gear transmission pair 7; thus the first gear startup is completed.

Figure 3:
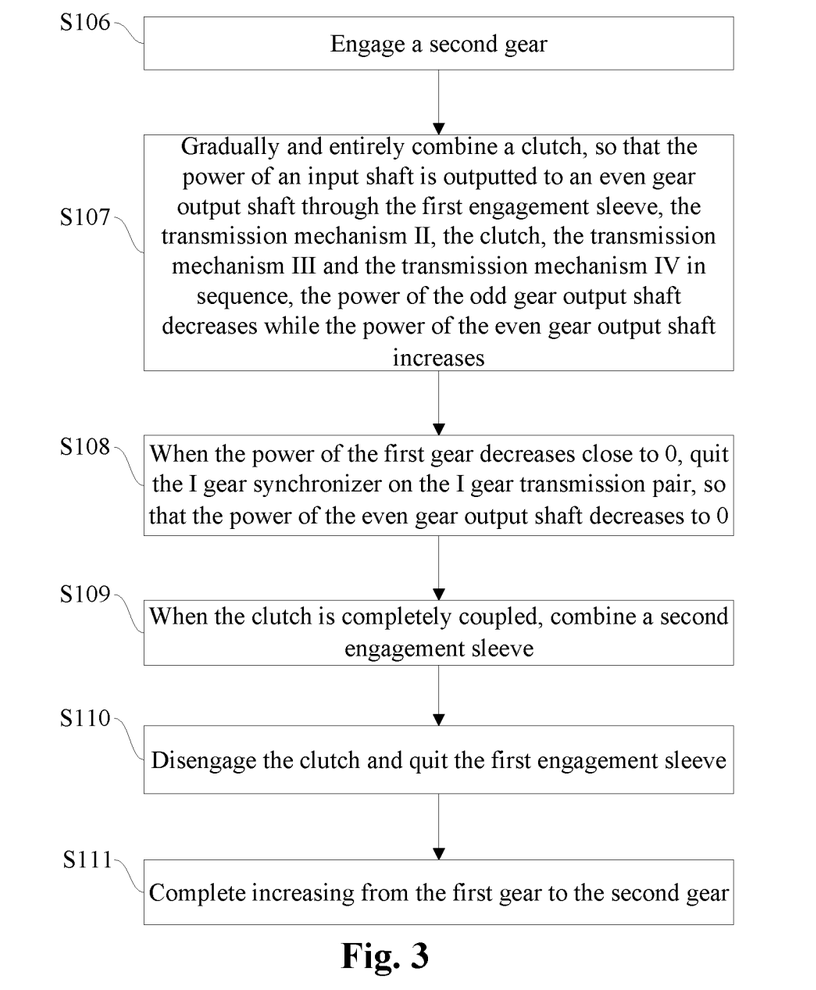
FIG. 3 is a control flow of increasing from a first gear to a second gear of the mechanical transmission as shown in FIG. 1.

FIG. 3 schematically displays a control flow of increasing from the first gear to the second gear of the mechanical transmission as shown in FIG. 1.

As shown in FIG. 3, the control flow of increasing from the first gear to the second gear of the mechanical transmission is as follows:

at S106, a second gear is engaged;

at S107, a clutch 4 is gradually combined; at this moment, the power of an input shaft 1 is outputted to an even gear output shaft 6 through a first engagement sleeve 2, a transmission mechanism II 12, the clutch 4, a transmission mechanism III 13 and a transmission mechanism IV 14 in sequence, so that the power of an odd gear output shaft 5 decreases while the power of the even gear output shaft 6 increases;

at S108: when the power of the first gear decreases close to 0, an I gear synchronizer 71 on an I gear transmission pair 7 is quitted, so that the power of the odd gear output shaft 5 decreases to 0;

at S109, when the clutch 4 is completely combined, the second engagement sleeve 3 combined; at this moment, the power of the input shaft 1 is outputted to the even gear output shaft 6 through the second engagement sleeve 3 and the transmission mechanism IV 14 in sequence on one hand, and on the other hand, the power of the input shaft 1 is outputted to the even gear output shaft 6 through the first engagement sleeve 2, the transmission mechanism II 12, the clutch 4, the transmission mechanism III 13 and the transmission mechanism IV 14 in sequence;

at S110, the clutch 4 is disengaged, and the first engagement sleeve 2 is quited; and at S111, the power of the input shaft 1 is continuously outputted to the even gear output shaft 6 through the second engagement sleeve 3 and the transmission mechanism IV 14 in sequence, and the even gear output shaft 6 completely outputs the power of the input shaft 1 to the output shaft 9 through an II gear transmission pair 8, thus increasing from the first gear to the second gear is completed.

Figure 4:
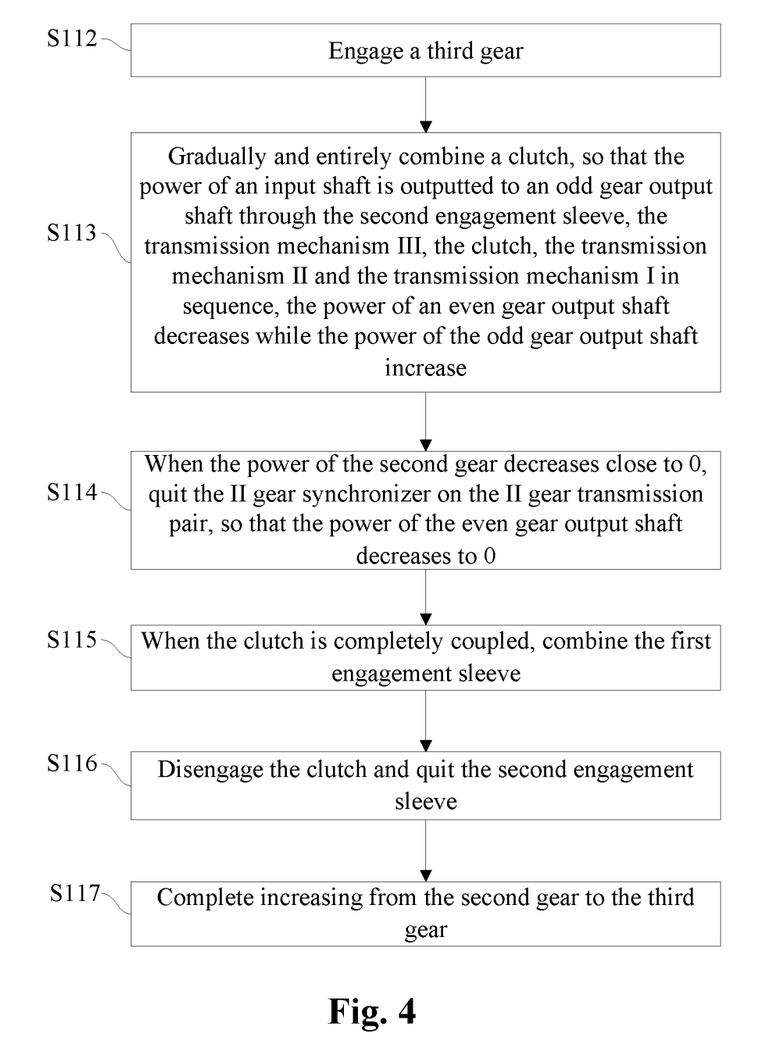
FIG. 4 is a control flow of increasing from a second gear to a third gear of the mechanical transmission as shown in FIG. 1.

FIG. 4 schematically displays a control flow of increasing from the second gear to the third gear of the mechanical transmission as shown in FIG. 1.

As shown in FIG. 4, in other embodiments, the control flow of increasing from the second gear to the third gear of the mechanical transmission is as follows:

at S112, a third gear is engaged;

at S113, a clutch 4 is gradually combined; at this moment, the power of an input shaft 1 is outputted to an odd gear output shaft 5 through a second engagement sleeve 3, a transmission mechanism III 13, the clutch 4, a transmission mechanism II 12 and a transmission mechanism I 11 in sequence, so that the power of an even gear output shaft 6 decreases while the power of the odd gear output shaft 5 increases;

at S114, when the power of the second gear decreases close to 0, an II gear synchronizer 81 on an II gear transmission pair 8 is quitted, so that the power of the even gear output shaft 6 decreases to 0;

at S115, the second engagement sleeve 3 is combined when the clutch 4 is completely combined, so that the power of the input shaft 1 is outputted to the odd gear output shaft 5 through the second engagement sleeve 3, the transmission mechanism III 13, the clutch 4, the transmission mechanism II 12 and the transmission mechanism I 11 in sequence on one hand, and on the other hand, the power of the input shaft 1 is outputted to the odd gear output shaft 5 through the first engagement sleeve 2 and the transmission mechanism I 11 in sequence;

at S116, the clutch 4 is disengaged and the second engagement sleeve 3 is quitted; and at S117, the power of the input shaft 1 is continuously outputted to the odd gear output shaft 5 through the first engagement sleeve 2 and the transmission mechanism I 11 in sequence; the odd gear output shaft 5 outputs the power of the input shaft 1 completely to the output shaft 9 through an III gear transmission pair; thus increasing from the second gear to the third gear is completed.

The control flow for increasing from the third gear to a fourth gear is the same as the control flow for increasing from the first gear to the second gear, while the control flow for increasing from the fourth gear to a fifth gear is the same as the control flow for increasing from the neutral gear to the first gear.

Figure 5:
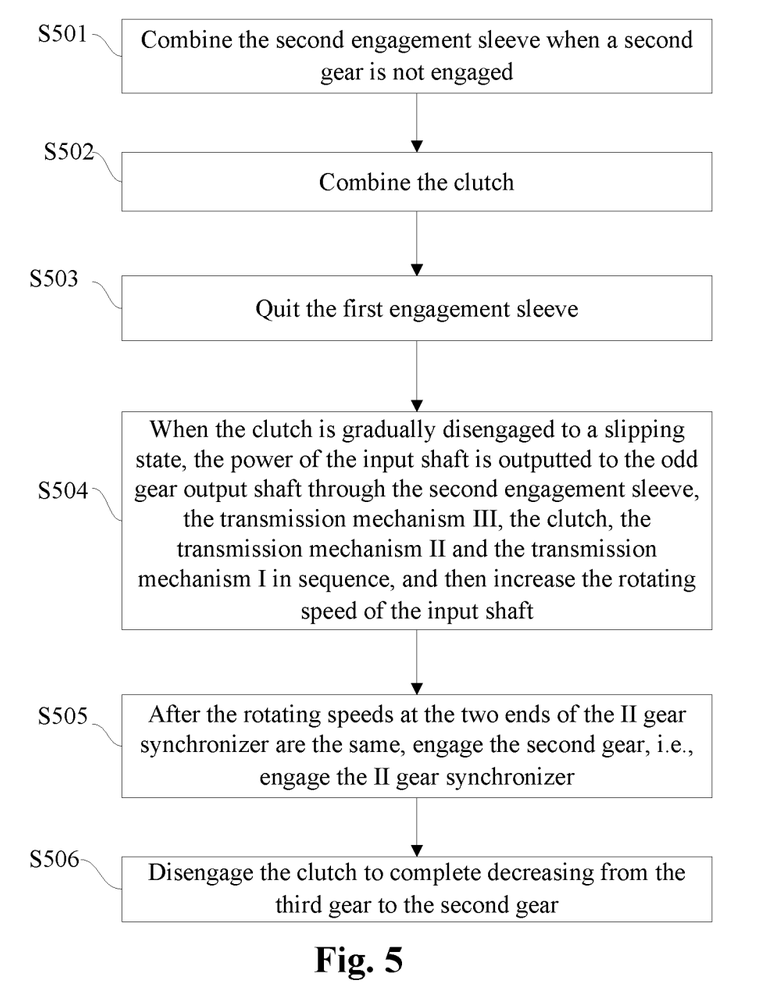
FIG. 5 is a control flow of decreasing from a third gear to a second gear of the mechanical transmission as shown in FIG. 1.

FIG. 5 schematically displays a control flow of decreasing from the third gear to the second gear of the mechanical transmission as shown in FIG. 1.

As shown in FIG. 5, in other embodiments, the control flow of decreasing from the third gear to the second gear of the mechanical transmission is as follows:

at S501, a second engagement sleeve 3 is combined when a second gear is not engaged;

at S502, a clutch 4 is combined;

at S503, the first engagement sleeve 2 is quitted;

at S504, the clutch 4 is gradually disengaged to a slipping state, and then the power of an input shaft 1 is outputted to an odd gear output shaft 5 through the second engagement sleeve 3, a transmission mechanism III 13, the clutch 4, a transmission mechanism II 12 and a transmission mechanism I 11 in sequence;

at S505, till the rotating speeds at the two ends of an II gear synchronizer 81 (the rotating speed of the odd gear output shaft 5 and the rotating speed of an output shaft 9) are the same, the second gear is engaged, i.e., an II gear synchronizer 81 is engaged; and at S506, the clutch 4 is disengaged, so that the power of the input shaft 1 is continuously outputted to the even gear output shaft 6 through the second engagement sleeve 3 and the transmission mechanism IV 14 in sequence; the even gear output shaft 6 outputs the power of the input shaft 1 completely to the output shaft 9 through the II gear transmission pair 8, thus decreasing from the third gear to the second gear is completed.

Figure 6:
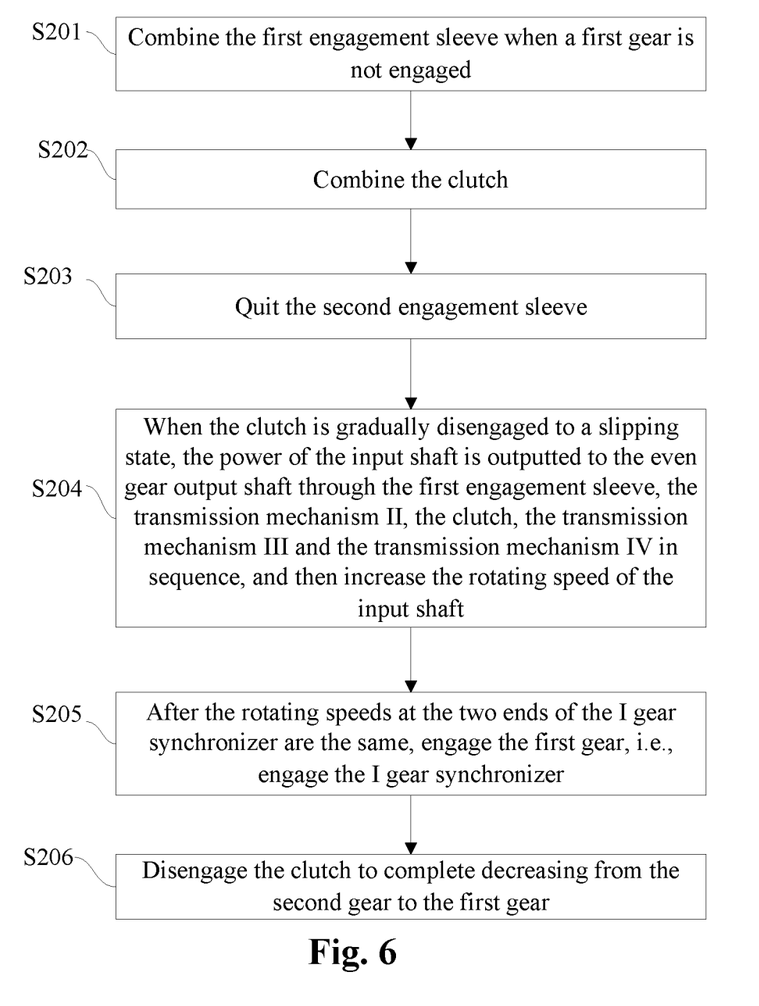
FIG. 6 is a control flow of decreasing from a second gear to a first gear of the mechanical transmission as shown in FIG. 1.

FIG. 6 schematically displays a control flow of decreasing from the second gear to the first gear of the mechanical transmission as shown in FIG. 1.

As shown in FIG. 6, the control flow of decreasing from the second gear to the first gear of the mechanical transmission is as follows:

at S201, a first engagement sleeve 2 is combined when the first gear is not engaged;

at S202, a clutch 4 is combined;

at S203: a second engagement sleeve 3 is quitted;

at S204, the clutch 4 is gradually disengaged to a slipping state, and then the power of the input shaft 1 is outputted to an even gear output shaft 6 through a first engagement sleeve 2, a transmission mechanism II 12, the clutch 4, a transmission mechanism III 13 and a transmission mechanism IV 14 in sequence; the rotating speed of the input shaft 1 is improved;

at S205, till the rotating speeds (the rotating speed of the even gear output shaft 6 and the rotating speed of an output shaft 9) at the two ends of an I gear synchronizer 71 are the same, the first gear is engaged, i.e., the I gear synchronizer 71 is engaged; and at S206, the clutch 4 is disengaged, so that the power of the input shaft 1 is continuously outputted to the odd gear output shaft 5 through the first engagement sleeve 2 and the transmission mechanism I 11 in sequence; the odd gear output shaft 5 outputs the power of the input shaft 1 completely to the output shaft 9 through the I gear transmission pair 7; thus decreasing from the second gear to the first gear is completed.

Figure 7:
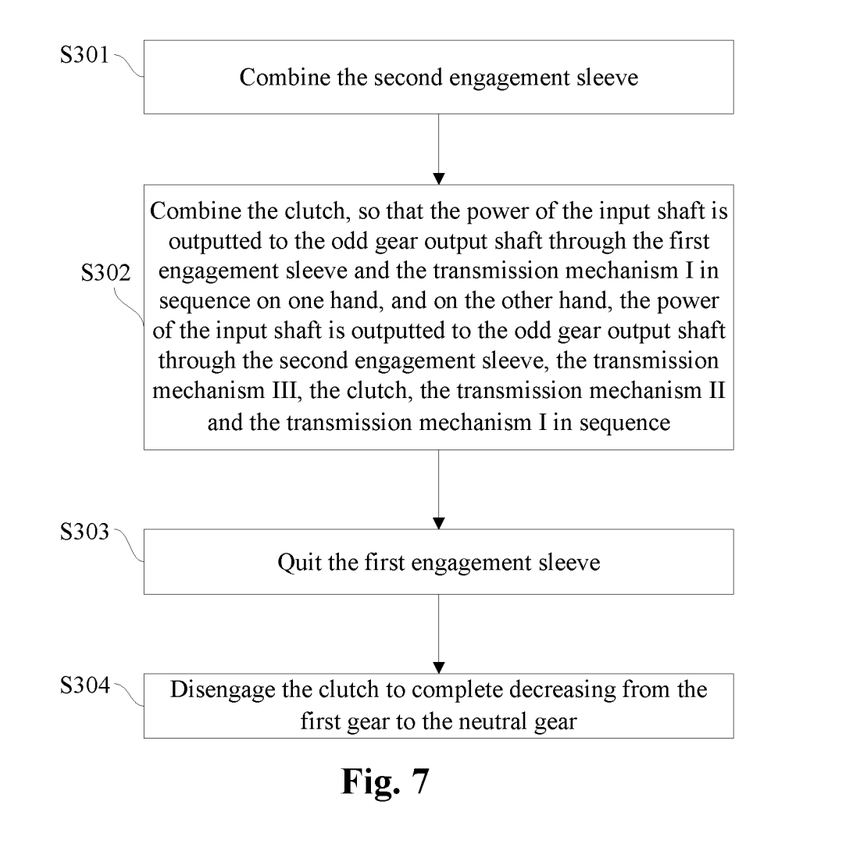
FIG. 7 is a control flow of decreasing from a first gear to a neutral gear of the mechanical transmission as shown in FIG. 1.

FIG. 7 schematically displays a control flow of decreasing from the first gear to the neutral gear of the mechanical transmission as shown in FIG. 1.

As shown in FIG. 7, the control flow of increasing from the first gear to the neutral gear of the mechanical transmission is as follows:

at S301, a second engagement sleeve is combined;

at S302, the clutch 4 is combined, so that the power of the input shaft 1 is outputted to the odd gear output shaft 5 through the first engagement sleeve 2 and the transmission mechanism I 11 in sequence on one hand, and on the other hand, the power of the input shaft 1 is outputted to the odd gear output shaft 5 through the second engagement sleeve 3, the transmission mechanism III 13, the clutch 4, the transmission mechanism II 12 and the transmission mechanism I 11 in sequence;

at S303, the first engagement sleeve 2 is quitted; and at S304, the clutch 4 is disengaged, so that the power of the input shaft 1 cannot be outputted to the odd gear output shaft 5, i.e., the power of the input shaft 1 cannot be outputted to the output shaft 9; thus decreasing from the first gear to the neutral gear is completed.

Figure 8:
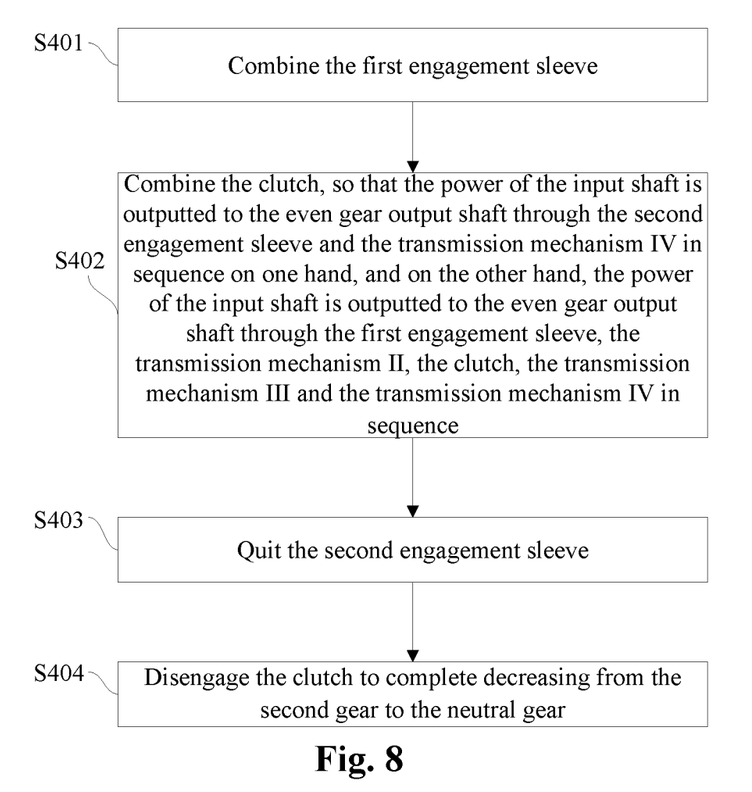
FIG. 8 is a control flow of decreasing from a second gear to a neutral gear of the mechanical transmission as shown in FIG. 1.

FIG. 8 schematically displays a control flow of decreasing from the second gear to the neutral gear of the mechanical transmission as shown in FIG. 1.

As shown in FIG. 8, the control flow of decreasing from the second gear to the neutral gear of the mechanical transmission is as follows:

at S401, a first engagement sleeve 2 is combined;

at S402, a clutch 4 is combined, so that the power of an input shaft 1 is outputted to an even gear output shaft 6 through a second engagement sleeve 3 and a transmission mechanism IV 14 in sequence on one hand, and on the other hand, the power of the input shaft 1 is outputted to an even gear output shaft 6 through the first engagement sleeve 2, an transmission mechanism II 12, the clutch 4, a transmission mechanism III 13 and the transmission mechanism IV 14 in sequence;

at S403, the second engagement sleeve 3 is quitted; and at S404, the clutch 4 is disengaged, so that the power of the input shaft 1 cannot be outputted to the even gear output shaft 6, i.e., the power of the input shaft 1 cannot be outputted to the output shaft 9; thus decreasing from the second gear to the neutral gear is completed.

The control flow for decreasing from a fourth gear to the third gear is the same as the control flow for decreasing from the second gear to the first gear, while the control flow for decreasing from a fifth gear to the fourth gear is the same as the control flow for decreasing from the third gear to the second gear.

The foregoing detailed description only presents some embodiments of the invention. Various modifications and improvements may be made by those skilled in the art without deviating from the spirit of the invention, and those shall all fall within the scope of the invention.

The invention claimed is:

1. A mechanical transmission, comprising an input shaft (1), a first engagement sleeve (2), a second engagement sleeve (3), a clutch (4), an odd gear output shaft (5) and an even gear output shaft (6), a transmission mechanism I (11), a transmission mechanism II (12), a transmission mechanism III (13) and a transmission mechanism IV (14), wherein:

the driving parts of the first engagement sleeve (2) and the second engagement sleeve (3) are connected with the input shaft (1);

the driven part of the first engagement sleeve (2) is connected with the odd gear output shaft (5) on one hand through the transmission mechanism I (11), and is connected with the even gear output shaft (6) through the transmission mechanism II (12), the clutch (4), the transmission mechanism III (13) and the transmission mechanism IV (14) in sequence on the other hand on the other hand; and the driven part of the second engagement sleeve (3) is connected with the even gear output shaft (6) through the transmission mechanism IV (14) on one hand, and is connected with the odd gear output shaft (5) through the transmission mechanism III (13), the clutch (4), the transmission mechanism II (12) and the transmission mechanism I (11) in sequence on the other hand.

2. The mechanical transmission according to claim 1, further comprising an I gear transmission pair (7), an II gear transmission pair (8) and an output shaft (9), wherein said odd gear output shaft (5) is connected with the output shaft (9) through the I gear transmission pair (7), and said even gear output shaft (6) is connected with the output shaft (9) through the II gear transmission pair (8).

3. The mechanical transmission according to claim 2, wherein said I gear transmission pair (7) is configured with an I gear synchronizer (71), and said II gear transmission pair (8) is configured with an II gear synchronizer (81).

4. The mechanical transmission according to claim 3, wherein said transmission mechanism I (11), said transmission mechanism II (12), said transmission mechanism III (13) and said transmission mechanism IV (14) are one of transmission mechanisms that partially or entirely adopt gear transmission, transmission mechanisms that partially or entirely adopt transmission mechanisms.

5. The mechanical transmission according to claim 3, wherein said clutch (4) is a dry clutch, a wet clutch, a magnetic clutch, a hydraulic coupler, a hydraulic torque converter, an electric-drive clutch, or a hydraulic-drive clutch.

6. A method for controlling up-shift of the mechanical transmission according to claim 3, comprising the following steps of:
- S 101: engaging a first gear, and combining the second engagement sleeve (3);
- S 102: gradually coupling the clutch (4) to output the power of an input shaft (1) to the first gear;
- S 103: combining the first engagement sleeve (2);
- S104: gradually disengaging the clutch (4); and
- S105: quitting the second engagement sleeve (3) to complete the first gear startup.

7. The method for controlling up-shift of the mechanical transmission according to claim 6, further comprising the following steps of:
- S 106: engaging a second gear;
- S107: gradually combining the clutch (4), wherein the power of the first gear decreases while the power of the second gear increases at the same time;
- S108: when the power of the first gear decreases close to 0, quitting the I gear synchronizer (71), so that the power of the first gear decreases to 0;
- S 109: when the clutch (4) is completely coupled, combining the second engagement sleeve (3);
- S 110: disengaging the clutch (4) and quitting the first engagement sleeve (2); and,
- S 111: outputting the power of the input shaft (1) to the second gear to complete the up-shift of the second gear.

8. A method for controlling the mechanical transmission according to claim 3 to decrease from a second gear to a first gear, comprising the following steps of:
- S201: combining the first engagement sleeve (2) when the first gear is not engaged;
- S202: combining the clutch (4);
- S203: quitting the second engagement sleeve (3);
- S204: gradually disengaging the clutch (4) to a slipping state, then increasing the rotating speed of an input shaft (1);
- S205: when the rotating speeds at the two ends of an I gear synchronizer (71) are the same, engaging the first gear, i.e., engaging the I gear synchronizer (71); and

- S206: disengaging the clutch (4) to decrease from the second gear to the first gear.

9. A method for controlling the mechanical transmission according to claim 3 to decrease from a first gear to a neutral gear, comprising the following steps of:
- S301: combining the second engagement sleeve (3);
- S302: combining the clutch (4);
- S303: quitting the first engagement sleeve (2); and
- S304: disengaging the clutch (4) to decrease from the first gear to the neutral gear.

10. The mechanical transmission according to claim 2, wherein said transmission mechanism I (11), said transmission mechanism II (12), said transmission mechanism III (13) and said transmission mechanism IV (14) are one of transmission mechanisms that partially or entirely adopt gear transmission, transmission mechanisms that partially or entirely adopt transmission mechanisms.

11. The mechanical transmission according to claim 2, wherein said clutch (4) is a dry clutch, a wet clutch, a magnetic clutch, a hydraulic coupler, a hydraulic torque converter, an electric-drive clutch, or a hydraulic-drive clutch.

12. The mechanical transmission according to claim 1, wherein said transmission mechanism I (11), said transmission mechanism II (12), said transmission mechanism III (13) and said transmission mechanism IV (14) are one of transmission mechanisms that partially or entirely adopt gear transmission, transmission mechanisms that partially or entirely adopt transmission mechanisms.

13. The mechanical transmission according to claim 1, wherein said clutch (4) is a dry clutch, a wet clutch, a magnetic clutch, a hydraulic coupler, a hydraulic torque converter, an electric-drive clutch, or a hydraulic-drive clutch.

14. The mechanical transmission according to claim 1, wherein said clutch (4) is a dry clutch, a wet clutch, a magnetic clutch, a hydraulic coupler, a hydraulic torque converter, an electric-drive clutch, or a hydraulic-drive clutch.

* * * * *